April 10, 1951    W. A. HIGINBOTHAM ET AL    2,548,790
SHAFT ROTATION INDICATING CIRCUIT
Filed July 9, 1945
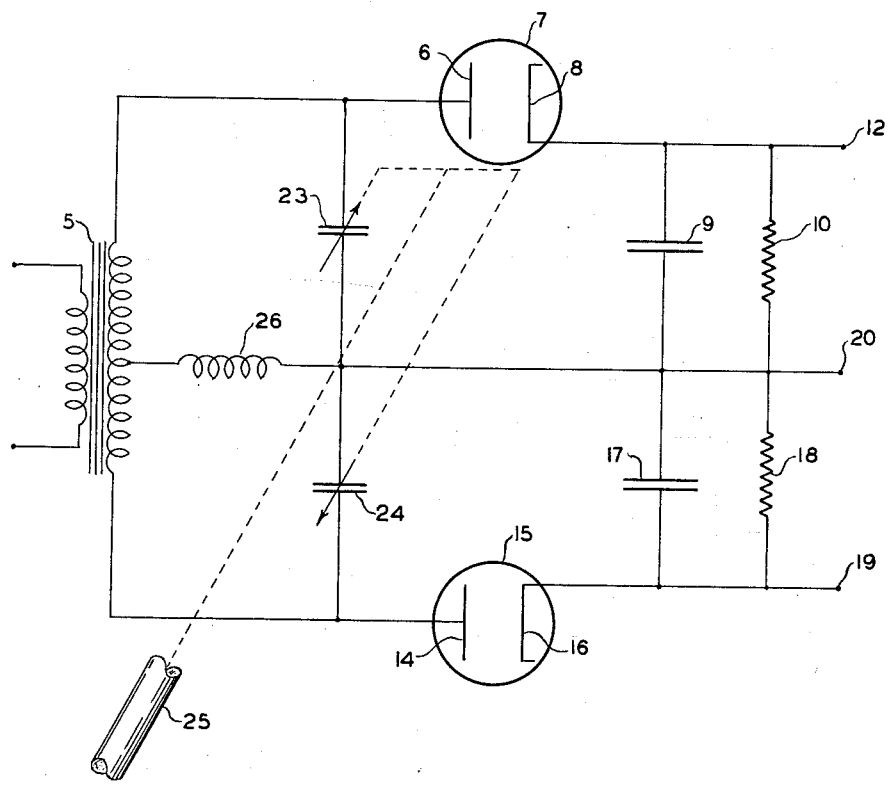
INVENTORS
WILLIAM A. HIGINBOTHAM
FRED F. SLACK
BY
ATTORNEY Patented Apr. 10, 1951

2,548,790

UNITED STATES PATENT OFFICE 2,548,790

SHAFT ROTATION INDICATING CIRCUIT

William A. Higinbotham, Santa Fe, N. Mex., and Fred F. Slack, Medford, Mass., assignors to the United States of America as represented by the Secretary of War Application July 9, 1945, Serial No. 604,036

2 Claims. (Cl. 177—351)

This invention relates in general to electrical circuits and more particularly to those circuits which are used for remote indication of the position of a mechanical member.

It is often of advantage in a system employing moving or rotating members to have a means of determining the instantaneous position of such members. One such instance is that where it is desired to have knowledge of the angular position of a rotating shaft.

Accordingly, it is one object of the present invention to provide means for indication of the instantaneous angular position of a shaft with respect to a reference position.

Another object of the invention is to provide electrical means for continuously indicating the angular position of a rotating mechanical member.

Still another object is to provide voltages proportional to a mechanical motion.

Yet another object is to provide a sensitive and quickly responsive means of angular shaft position indication.

These and further objects of the present invention will be apparent to those skilled in the art upon reference to the following specification, claims and drawing in which the single figure represents a schematic diagram of one embodiment of the invention.

Referring now to the accompanying figure, the primary winding of transformer 5 forms the input means to the system. One side of the secondary winding of transformer 5 is connected to anode 6 of a two-electrode electron discharge tube, or diode, 7. Cathode 8 of tube 7 is connected to the parallel combination of capacitor 9 and resistor 10. Output terminal 12 is connected to cathode 8 of tube 7. The other side of secondary winding of transformer 5 is connected to anode 14 of a second two-electrode electron discharge tube, or diode, 15. Cathode 16 of diode 15 is connected to capacitor 17 and resistor 18 in parallel and connection is also made from cathode 16 to output terminal 19. The parallel combinations of capacitor 9 and resistor 10 and capacitor 17 and resistor 18 are connected in series, the junction point being connected to output terminal 20. Across the secondary winding of transformer 5 is connected a series combination of variable capacitors 23 and 24 the rotors of which are ganged together and mechanically connected to a rotatable shaft 25. Connection is made from the juncture of capacitors 23 and 24 through inductor 26 to the midpoint of the secondary winding of transformer 5. Direct connection is made from the juncture of capacitors 23 and 24 to output terminal 20.

An externally generated reference alternating voltage which may be substantially sinusoidal in form is applied to the primary winding of transformer 5 and appears across the secondary winding. Capacitors 23 and 24 are small in value and are not of sufficient capacity to be resonant with the secondary winding of transformer 5 at the applied reference frequency. Hence they act as a capacitive voltage divider, the voltage across each capacitor being inversely proportional to its instantaneous capacity. At some predetermined position of the rotating shaft 25 the voltage across each will be the same. Any angular departure of the shaft from this predetermined position will cause one capacitor to increase in capacity and the other to decrease, thus altering the proportion of the reference voltage appearing across each.

The alternating voltage existing across capacitor 23 is rectified by a diode 7 and filtered by capacitor 9 and resistor 10 so that a relatively steady potential, which is proportional to the amplitude of the voltage across capacitor 23, appears between output terminals 12 and 20. Similarly a substantially unidirectional potential proportional to the amplitude of the voltage across capacitor 24 appears between output terminals 19 and 20. Inductor 26 completes the return path for direct current flowing in the plate circuits of diodes 7 and 15 while blocking the passage of alternating current.

If capacitors 23 and 24 are equal in value, the voltage between terminals 12 and 20 will equal the voltage between terminals 19 and 20. If, however, shaft 25 moves from its reference position, one capacitor will increase in value while the other will decrease and the secondary voltage of transformer 5 will divide unequally across them, the higher proportion of alternating potential being across the capacitor which is smaller in value. Therefore, one of the steady output potentials will increase while the other will decrease. An electrical indicating device may be attached to output terminals 12, 19, and 20 and used to provide a remote indication of the position of the rotating shaft.

It will be apparent to those skilled in the art that what has been described herein is but a preferred embodiment of the present invention and changes and modifications therein may be made without exercise of inventive ingenuity. Hence, all such variants are claimed as may fall fairly within the spirit and scope of the hereinafter appended claims.

What is claimed is:

1. An electrical circuit comprising transformer input means, two variable capacitors, means for connecting said capacitors serially across the secondary winding of said input transformer, means for imparting to the rotors of said variable capacitors motion substantially proportional to the movement of a rotatable shaft external to the circuit whereby for movement of said shaft in a given direction the capacity of one of said capacitors increases and the capacity of the other of said capacitors decreases, a first two-electrode electron discharge device, a first capacitor and a first resistor connected in parallel, means for connecting said first electron discharge device in series with said first parallel resistor-capacitor combination and connecting said series combination across one of said variable capacitors, a second two-electrode electron discharge device and a second parallel resistor-capacitor combination similar to said first parallel resistor-capacitor combination, means for connecting said second electron discharge device and said second parallel resistor-capacitor combination in series across the second of said variable capacitors, first output means connected to the cathode electrode of said first electron discharge device, second output means connected to the cathode electrode of said second electron discharging device, third output means connected to the junction point of said variable-capacitors, and means for passing direct currents from said junction point to the midpoint of the secondary winding of said input transformer.

2. An electrical circuit comprising an input transformer having a primary winding and a secondary winding, a pair of variable capacitors in electrical series arrangement and connected across the terminal ends of said secondary winding; means to vary oppositely the capacitance of said variable capacitors in accordance with the angular movement of a rotatable shaft external to the circuit; a coil connected between the junction of said capacitors and the midpoint of said secondary winding, said coil being adapted to pass direct current and to block the passage of alternating current; a pair of rectifiers having first and second elements, the first corresponding elements of said rectifiers being connected respectively to opposing terminal ends of said secondary winding; a pair of filter networks, said filter networks being connected respectively between the second corresponding elements of said rectifiers and the junction point of said variable capacitors; and output means connected across said filter networks whereby steady unidirectional voltages may be obtained that are substantially proportional to the angular position of said shaft.

WILLIAM A. HIGINBOTHAM.
FRED F. SLACK.

REFERENCES CITED

The following references are of record in the file of this patent:

UNITED STATES PATENTS

| Number | Name | Date |
| --- | --- | --- |
| 2,183,078 | Kemler | Dec. 12, 1939 |
| 2,268,956 | Mestas | Jan. 6, 1942 |
| 2,394,079 | Langer | Feb. 5, 1946 |

FOREIGN PATENTS

| Number | Country | Date |
| --- | --- | --- |
| 400,289 | Great Britain | Oct. 26, 1933 |
| 836,827 | France | Oct. 25, 1938 |